United States Patent [19]
Morton

[11] 3,725,696
[45] Apr. 3, 1973

[54] PORTABLE LIGHT HOLDER FOR CAMPER'S GAS LAMP

[76] Inventor: Allen Russell Morton, 1425 Brookline Avenue, Plymouth, Mich. 48170

[22] Filed: Oct. 19, 1970

[21] Appl. No.: 81,766

[52] U.S. Cl. ................240/84, 240/11.2, 240/44.1, 240/52.3, 240/90
[51] Int. Cl. ..............................................F21v 21/00
[58] Field of Search .........240/11.2, 44.1, 52.3, 81 R, 240/81 BD, 84, 90, 105, 67, 68, 70

[56] References Cited

UNITED STATES PATENTS

| | | |
|---|---|---|
| 3,015,720 | 1/1962 | Silverman............................240/84 X |
| 3,239,829 | 3/1966 | Cline et al. .........................240/68 X |
| 891,448 | 6/1908 | Snider.................................240/84 UX |
| 2,482,543 | 9/1949 | Jackson et al. ....................240/105 X |
| 1,790,500 | 1/1931 | Fischer...............................240/81 BD |
| 1,819,733 | 8/1931 | Castelli...............................240/84 X |
| 2,482,543 | 9/1949 | Jackson et al. ....................240/105 X |
| 2,673,286 | 3/1954 | Moore.................................240/11.2 R |
| 3,015,720 | 1/1962 | Silverman............................240/84 X |
| 3,197,631 | 7/1965 | Jensen.................................240/81 R |
| 3,287,549 | 11/1966 | Lantery...............................240/90 X |

Primary Examiner—Joseph F. Peters, Jr.
Attorney—Whittemore, Hulbert & Belknap

[57] ABSTRACT

A camp light holder including a telescoping shaft, structure including a substantially flat member extending transversely of the shaft at the bottom thereof and at least one elongated sharpened member for securing the shaft in an upright position on the ground, bail means removably secured to the top of the shaft for supporting a camper's gas lamp and reflecting means operably associated with the bail means for directing the light from the gas lamp. A clamp is provided in one modification of the light holder for maintaining the telescoping shaft at a predetermined height, while an axially split wedging collar is provided in another modification to maintain the shaft at a desired height.

11 Claims, 11 Drawing Figures

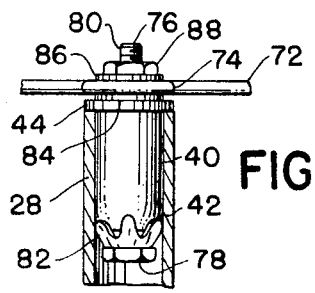
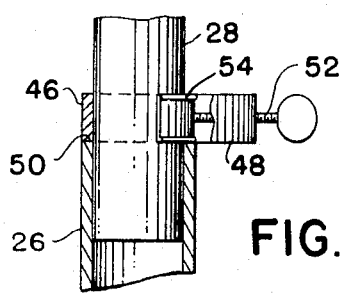
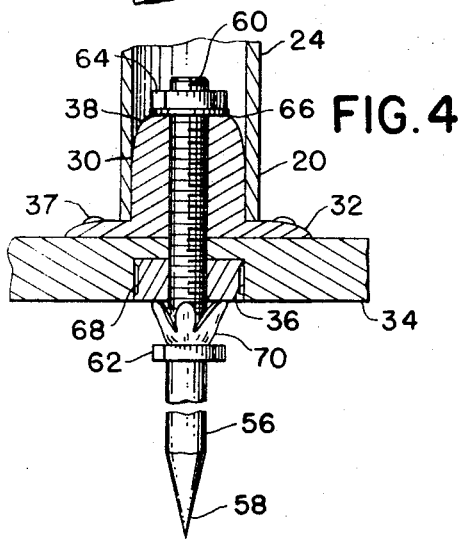
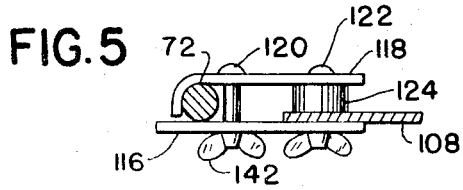
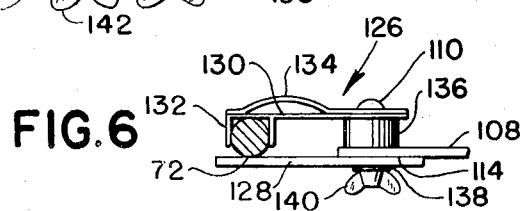
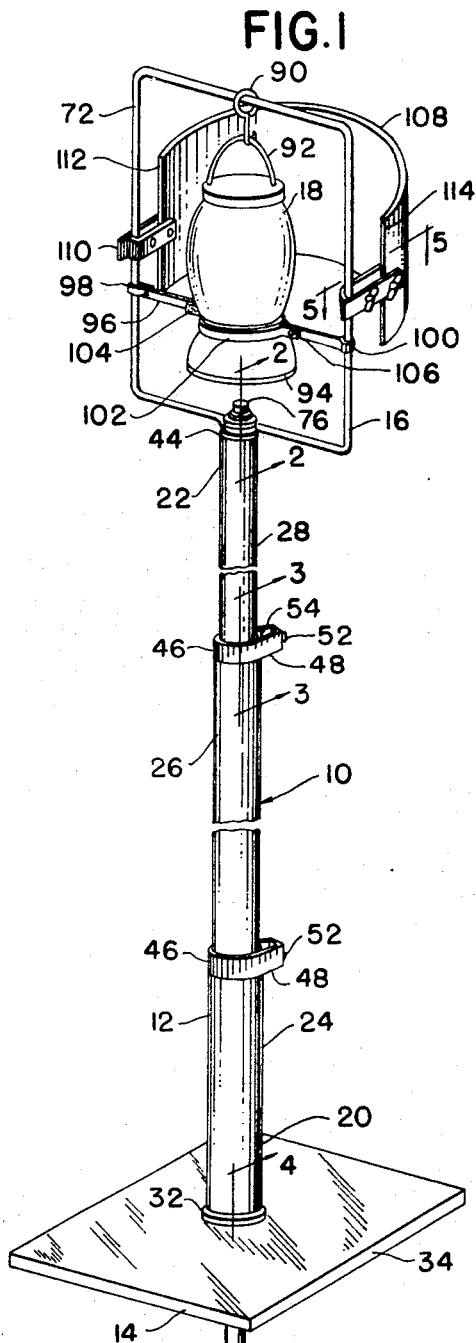

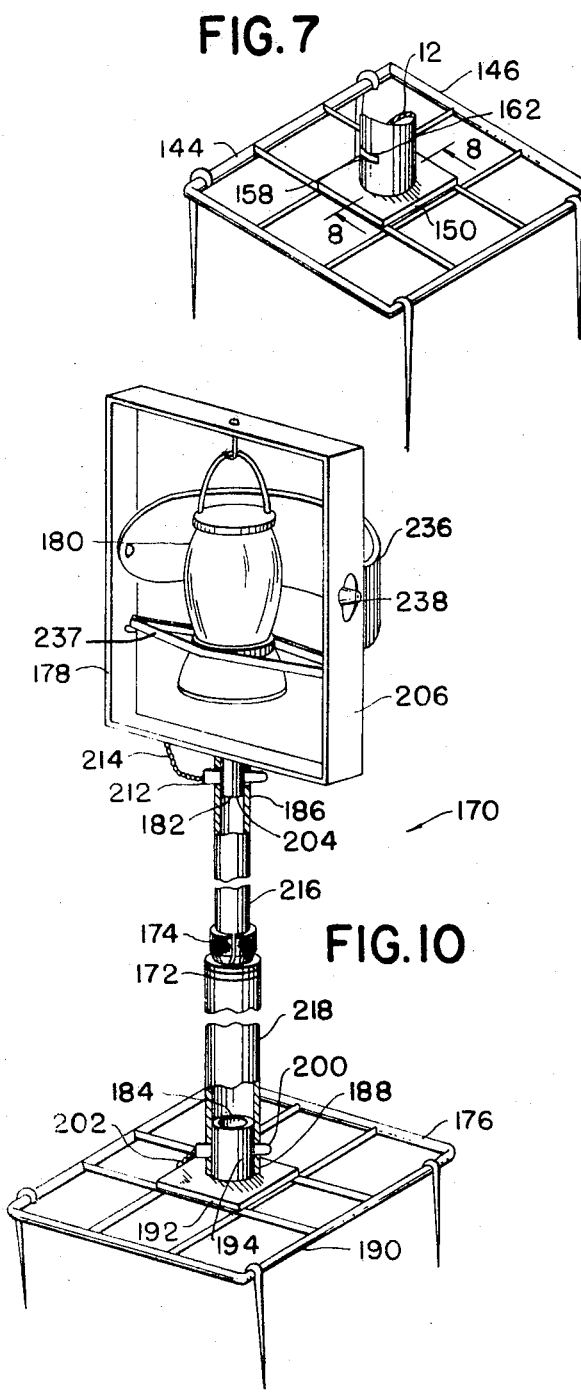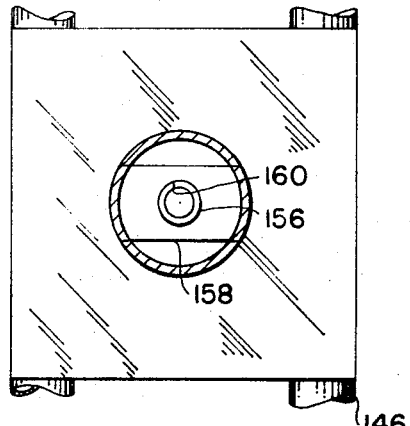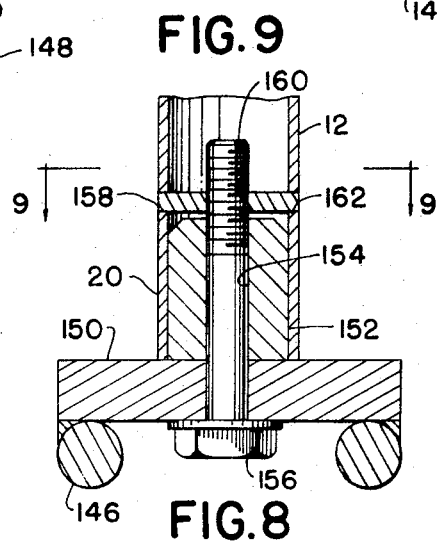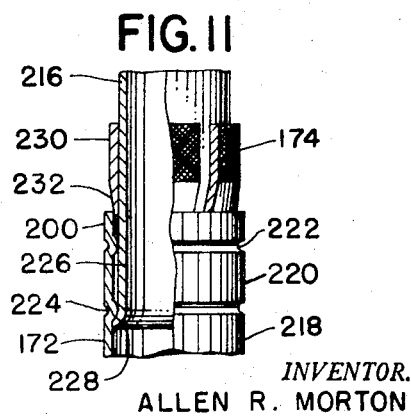

PORTABLE LIGHT HOLDER FOR CAMPER'S GAS LAMP

BACKGROUND OF THE INVENTION

1. Field of the Invention

The invention relates to camping equipment and refers more specifically to structure for supporting a camper's gas light or the like in an adjusted position over the ground and directing the light therefrom in a desired direction.

2. Description of the Prior Art

In the past camp lighting has sometimes been accomplished by means of campfires alone. Where camp lights have been used their use has been less rewarding than it should have been due to the necessity of finding means for supporting the light in the exact required location. Even with a camp light supported in an exact required location the light therefrom has not been sufficient in many instances due to the relatively low candle power output of most camp lights and the usual general diffusion of the light in all directions.

SUMMARY OF THE INVENTION

It is therefore an object of the present invention to provide improved camp light support structure.

Another object is to provide camp light support structure including means for supporting the structure on the ground at any desired location.

Another object is to provide camp light support structure as set forth above including means for adjusting the height at which the gas light is supported.

Another object is to provide camp light support structure as set forth above including means for resiliently supporting a camp light therefrom.

Another object is to provide camp light support structure as set forth above including reflecting means for directing the light from the camp light in a predetermined direction.

Another object is to provide camp light support structure as set forth above wherein the reflecting means is adjustable.

Another object is to provide camp light support structure as set forth above which is commapsible and compact on collapsing for packaging and storing.

Another object is to provide structure for supporting a camp light or the like which is simple in construction, economical to manufacture and efficient in use.

Other objects and features of the invention will become apparent as the description proceeds, especially when taken in conjunction with the accompanying drawings illustrating a preferred embodiment of the invention, wherein:

BRIEF DESCRIPTION OF THE DRAWINGS

FIG. 1 is a broken perspective view of camp light support structure constructed in accordance with the invention.

FIGS. 2 through 4 are enlarged section views of portions of the camp light support structure illustrated in FIG. 1 taken substantially on the lines 2—2, 3—3 and 4—4 in FIG. 1.

FIG. 5 is an enlarged cross section of a portion of the camp light support structure illustrated in FIG. 1 taken substantially on the line 5—5 in FIG. 1.

FIG. 6 is a section view similar to FIG. 5 of modified structure which may be substituted for the structure illustrated in FIG. 5.

FIG. 7 is a perspective view of modified base structure for the support structure illustrated in FIG. 1.

FIG. 8 is an enlarged partial section view of the base structure illustrated in FIG. 7 taken substantially on the line 8—8 in FIG. 7.

FIG. 9 is a section view of the portion of the base structure illustrated in FIG. 8 taken substantially on the line 9—9 in FIG. 8.

FIG. 10 is a broken perspective view of another modification of the camp light support structure illustrated in FIGS. 1–5.

FIG. 11 is an enlarged partial elevation view partly broken away of the modified camp light support structure illustrated in FIG. 10.

DESCRIPTION OF THE PREFERRED EMBODIMENTS

With particular reference to the Figures of the drawing, one embodiment of the present invention will now be considered in detail.

As illustrated best in FIG. 1, the camp light support structure 10 includes a shaft 12 and base means 14 for supporting the shaft 12 in an upright position on the ground at end 20 of the shaft 12. Structure 16 is provided at end 22 of the shaft 12 to which the camp light 18 is resiliently supported.

In use, the support structure 10 which is collapsible is assembled as shown in FIG. 1 and is positioned in a desired location on the ground with the shaft 12 held in an upright position by base means 14. The camp light 18 is then lit and is resiliently supported at the end 22 of the shaft 12 to provide the desired camp light which may be directed in any desired direction.

More specifically the shaft 12 includes three cylindrical sections 24, 26 and 28 in graduated diameters, as illustrated best in FIG. 3. Cylindrical sections 24, 26 and 28 of the shaft 12 telescope within each other.

The bottom end 20 of the shaft 12 is secured to the base structure 14 for supporting the shaft 12 on the ground by means of a cylindrical coupling 30 having a radially outwardly extending flange 32 at one end thereof which may be secured to the flat plate 34 of the structure 14 by convenient means, such as screws 37 or the like. The end 20 of the shaft 12 is then forced over the other end of the coupling 30 which is tapered at 38 to guide the end 20 of the shaft 12 thereover to secure the shaft 12 to the coupling 30. Similarly the upper end 22 of the shaft 12 is secured to the coupling member 40 by being forced over the tapered end 42 thereof into engagement with the flange 44 at the other end of the coupling 40, as illustrated in FIG. 2.

The length of the shaft 12 is adjusted by adjusting the relative telescoping positions of the sections 24, 26 and 28 of the shaft and securing them in the adjusted positions by the clamp structure 46 illustrated best in FIG. 3. The clamp structure 46 comprises a tension band 48 surrounding the smaller diameter telescoping section 28, as shown in FIG. 3, and resting on the end 50 of the larger diameter telescoping section 26, as shown in FIG. 3. The compression bolt 52 is threaded through the tension band 48 and includes on the end thereof arcuate abutment 54.

Thus in operation of the clamping structure 46, the bolt 52 is loosened and the sections 26 and 28 of the shaft 12 are relatively adjusted after which the tension band 48 is positioned, as shown in FIG. 3, over the end 50 of section 26 of shaft 12. The bolt 52 is then tightened to urge the abutment 54 into engagement with the section 28 of the shaft 12 whereby section 28 of the shaft 12 is prevented from telescoping into the section 26 of the shaft 12 due to gravity with the shaft 12 in a vertical position and the shaft 12 is quickly disassembled for packaging.

The base structure 14 for supporting the shaft 12 in a vertical position on the ground includes the elongated member 56 having the sharpened end 58 and the threaded end 60 and the substantially flat rectangular plate 34 having the steeped opening 36 extending therethrough, as illustrated best in FIG. 4.

The elongated member 56 is secured to the plate 34 by means of the abutment nut 62 on the threaded end 60 thereof and the nut 64 securing therebetween the washer 66, the coupling member 30, spacer 68 positioned in opening 36 in the plate 34 and the resilient cup 70 positioned between the abutment nut 62 and the spacer 68, as shown best in FIG. 4.

With the elongated member 56 and plate 34 assembled, as illustrated in FIG. 4, the elongated member 56 is driven into the ground to support the shaft 12 connected to the coupling member 30. The plate 34 aids in driving the shaft 56 in the ground and assures a stable upright position for the shaft 12.

The structure 16 for supporting the gas light 18 on the other end 22 of the shaft 12 includes the bail 72 which is generally rectangular in form, as shown in FIG. 1, and which includes the enlarged portion 74 at the bottom thereof having an opening therethrough. Bail 72 is secured to the coupling member 40 which in turn is secured to the upper end of the shaft 12, as previously indicated, by means of the bolt 76 having a headed end 78 and a threaded end 80. Bolt 76 extends through the resilient cup 82, coupling member 40, washer 84, opening in bail 74 and washer 86 and is held in position by the nut 88, as illustrated best in FIG. 2.

The gas light 18 is supported on the bail 72 by means of the hook 90 carried by the bail 72 engaging the bail 92 of the light 18. The bottom 94 of the light 18 is held between the resilient band 96 secured at the opposite ends 98 and 100 to the bail 72 and the resilient band 102 which is secured to the band 96 at 104 by convenient means, such as stitching, and which is releasably secured to the band 96 at the other end by the snap means 106.

With the light 18 thus secured to the bail 72 the light will not be damaged by being blown about in the wind and coming in contact with the bail 72. This is particularly important since it will be understood that in the usual gas light the mantle is very fragile and will disintegrate if the gas light is blown against the bail 72.

To facilitate directing the light from the light 18, the reflecting sheet 108 is provided. Reflecting sheet 108 is a sheet of, for example, highly polished aluminum which is flexible and resilient so that it may be bent in an arcuate shape, as shown in FIG. 1, and will return to a flat shape for packaging and storage on the ends 112 and 114 thereof being disconnected from the bail 72.

Structure 110, as best shown in FIG. 5, is provided at the opposite ends 112 and 114 of the reflecting sheet 108 to secure the reflecting sheet 108 to the bail 72. Structure 110 pivotally supports the ends 112 and 114 of the reflecting sheet 108 so that the reflecting sheet 108 is movable to direct the light from the light 18 up or down. It will also be recognized that the shaft 12 may be rotated about the member 56 so that the light from the camp light 18 bay be directed in substantially any direction desired.

Structure 110 includes a first flat band 116 extending on one side of the bail 72 and having a pair of openings therethrough and a band 118 adapted to wrap around the other side of the bail 72 and having a pair of openings therein aligned with the openings in the band 116. The bolt 120 extends between aligned openings in the bands 116 and 118, as shown in FIG. 5, to clamp the bail 72 between the bands 116 and 118. An opening is provided through the end 114 of the sheet 108 and the bolt 122 extends between the bands 116 and 118 through aligned openings therethrough and through the opening in the end 114 of the reflecting sheet 108 and the spacing member 124 to pivotally secure the end 114 of the reflecting sheet 108 in any adjusted position with respect to the bands 116 and 118.

The modified structure 126 for securing the reflecting sheet 108 to the bail 72 illustrated in FIG. 6 includes a first substantially flat band 128, second band 130 constructed of spring material and having projections 132 at one end thereof for holding the bail 72 therebetween in engagement with the band 128, spring 134 which is optional and spacer 136. As before, the end 114 of the reflecting sheet 108 is secured between the bands 128 and 130 by means of the bolt 110 passing through spring 134, band 130, spacer 136, end 114 of reflecting sheet 108, band 128 and washer 138 which is secured in adjusted position by means of the wing nut 140.

The advantage of the structure illustrated in FIG. 6 over that of FIG. 5 is that the reflecting sheet 108 may be adjustably secured to the bail 72 by merely springing the spring band 130 away from the band 128 and inserting the bail 72 between the projections 132 without the necessity of loosening and tightening the wing nut 140.

When the camp light support 10 is not in use the shaft 12 may be rapidly disassembled in three sections as indicated above and easily removed from the coupling members 30 and 40. The elongated member 56 is removed from the plate 34 by loosening the nut 64 and the reflecting sheet 108 is removed from the bail 72 by loosening the wing nuts 142 or merely snapping the bail 72 out of the structure 126 of FIG. 6. Disassembled the camp light supporting structure is readily packaged for storage in a compact package. Conversely, when it is again desired to use the camp light support structure 10, the reverse procedure may be followed to rapidly assemble the camp light supporting structure 10.

In the modified base structure 144 illustrated in FIGS. 7, 8 and 9 a substantially flat rigid grid 146 is constructed of metal rods or the like which may be welded together as illustrated. The grid 146 is secured to the ground by means of the hooks 148 driven into the ground and extending over portions of the grid 146.

A small rectangular plate 150 is secured to the grid 146 by welding or the like which plate has the cylindrical member 152 secured thereto. The cylindrical member extends transversely of the grid 146 and the end 20 of the shaft 12 fits thereover. The plate 150 and cylindrical member 152 have the longitudinally extending opening 154 therethrough through which the bolt 156 extends. Bolt 156 is threadedly engaged with the clamping member 158 having the threaded opening 160 therethrough which extends transversely of the shaft 12 through the openings 162.

Thus, on assembly, the shaft 12 is positioned over the cylindrical member 152, the clamping member 158 is passed through the openings 162 and the bolt 156 is extended through the opening 154 and is threaded through the opening 160 in the clamping member 158. The shaft 12 is thus rigidly secured to the plate 150 which is in turn secured to the grid 146. The grid 146 may then be positioned on the ground and the hooks 148 driven into the ground and extended over portions of the grid 146, as shown in FIG. 7, to hold the shaft 12 in an upright position.

It will be understood that structure similar to that illustrated in FIGS. 7–9 may be provided to secure the bail 72 to the end 22 of the shaft 12. The structure illustrated in FIGS. 7, 8 and 9 has the advantage of requiring fewer parts and the parts that are required may be made from standard stock rather than requiring special castings and forms.

The modified camp light support structure 170 illustrated in FIGS. 10 and 11 includes the shaft 172 having the unique coupling structure 174, base 176 and structure 178 for resiliently supporting the camp light 180. Unique coupling structure 182 and 184 are provided to secure the ends 186 and 188 respectively of shaft 172 to the structure 178 and the base 176.

Base 176 is similar to the modified base structure 144 in that it includes the grid 190 to which the rectangular plate 192 is secured and the cylindrical member 194 carried on the plate 192. The end 188 of shaft 172 extends over the cylindrical member 194. Aligned openings are provided through the shaft 172 and cylindrical member 194 through which the wedge 200 is inserted to lock the shaft 172 and cylindrical member 194 together. Wedge 200 may be secured to the plate 192 by convenient means, such as the chain 202, to prevent loss of the wedge 200 on disassembly of the camp light support structure 170.

The coupling 182 is similar to the coupling 184 for securing the base 176 to the shaft 172. Thus, the cylindrical member 204 is secured to the bottom of the rectangular band 206 of the structure 178. Aligned openings are provided in the cylindrical member 204 and shaft 172 through which the wedge 212 which is secured to the band 206 by the chain 214 is inserted.

In the modified camp light supporting structure 170 the sections 216 and 218 of shaft 172 are secured together in an adjusted position, as best shown in FIG. 11. As shown in FIG. 11, the upper end 220 of the section 218 of shaft 172 is provided with the annular indentations 222 and 224 which internally engage the lower end 226 of the section 216 of the shaft 172 to provide stability therefor. The lower end 226 of the section 216 of the shaft 172 is flared outwardly as indicated at 228 whereby the section 216 may not be pulled out of the section 218 of shaft 172. The sections 216 and 218 of shaft 172 may be secured in any relative axially adjusted position by means of the axially split wedging collar 230 which is sleeved over the lower end 226 of the section 216 and is provided with a bevelled lower end 232 operable to engage the top of the section 218 of shaft 172 and fit tightly around the bottom of the section 216 of the shaft 172 to prevent relative movement therebetween.

The structure 178 includes the rectangular band 206 to which the cylindrical member 204 is secured and from which the light 180 is hung. A simple rubber band 237 is used to resiliently support the light 180 to prevent it from swinging in the wind. With the flat band 178 the reflector 236 can be pivoted directly to the sides of the band 206 with a simple nut and bolt connection 238, as shown in FIG. 10.

While one embodiment of the present invention and modifications thereof have been disclosed in detail, it will be understood that other modifications and embodiments of the invention are contemplated. It is the intention to include all embodiments and modifications of the invention as are defined by the appended claims within the scope of the invention.

What I claim as my invention is:

1. Light support structure for a camp light or the like comprising a shaft, means at one end of the shaft for supporting the shaft on the ground in an upright position and means at the other end of the shaft for resiliently supporting a light including a bail having a circular opening therein, means securing the bail to the top of the shaft comprising a cylindrical member adapted to receive the other end of the shaft, a bolt extending through the cylindrical member and the circular opening in the bail having a head within the shaft, resilient means operable between the head of the bolt and the cylindrical member, a nut threaded on the other end of the bolt abutting the bail, a hook secured to the bail for supporting the light and resilient means secured to the bail and the light for resiliently holding the bottom of the light.

2. Structure as set forth in claim 1 wherein the means for supporting the shaft in an upright position includes a substantially flat plate, a cylindrical member secured to the plate for receiving the one end of the shaft, aligned openings extending through the plate and cylindrical member, an elongated small diameter member having one sharp end the other end of which is threaded and extends through the openings in the plate and cylindrical member at right angles to the plate, abutment means positioned between the pointed end of the elongated member and the plate, resilient means operable between the abutment means and the plate and means threaded over the threaded end of the elongated member for securing the elongated member to the cylindrical member and plate and biasing the resilient means.

3. Structure as set forth in claim 1 wherein the means for supporting the shaft in an upright position includes a grid, hooks for extending into the ground and over the grid to hold the grid in a fixed position on the ground, a plate secured to the grid, a cylindrical member secured to the plate and extending perpendicularly to the grid for receiving one end of the shaft, aligned openings extending through the cylindrical member and plate, a pair of aligned openings extending transversely through said shaft, a clamping member extending through the pair of aligned openings through said shaft having a threaded portion within the shaft and a bolt extending through the openings through the cylindrical member and plate threadedly engaging the clamping member.

4. Structure as set forth in claim 1 wherein the resilient means comprises an elastic band extending between the sides of the bail and secured thereto having a snap adjacent one end thereof and a second elastic band secured to the first elastic band adjacent the other end thereof and having a snap at the other end thereof engageable with the snap on the one end of the first elastic band adapted to fir around the bottom of the light hung from the hook and secure the light between the elastic bands when the snaps are engaged.

5. Structure as set forth in claim 1 and further including means secured to the means for supporting the light for reflecting the light in a predetermined direction.

6. Structure as set forth in claim 5 wherein the means for reflecting the light comprises a substantially flat polished sheet of reflecting material which is resilient and bent in the form of an arc and means at the ends of the reflecting sheet for securing the reflecting sheet to the means for supporting the light.

7. Structure as set forth in claim 6 wherein the means for supporting the light includes a bail and the means for securing the reflecting sheet to the bail comprises a substantially flat band having a pair of openings therethrough, a second band having a pair of openings therethrough one end of which is arcuate and fits around the bail, means extending between one of the openings in each of the bands for gripping the bail between the first band and the arcuate end of the second band, an opening through one end of the reflecting sheet and means extending between the other openings in the bands and through the opening in the reflecting sheet for releasably securing the one end of the reflecting sheet in any desired pivotal position with respect to the bands.

8. Structure as set forth in claim 6 wherein the means for supporting the light includes a bail, and the means for securing the reflecting sheet to the light supporting means comprises a first flat band, a second band having means at one end thereof for holding the bail therebetween and urging the bail against one end of the other band, openings through the opposite ends of the bands, an opening in the end of the reflecting sheet aligned with the openings in the other ends of the bands, a spacer positioned between the other ends of the bands also having an aligned opening therethrough, bolt means extending between the aligned openings for releasably securing the end of the reflecting sheet in any pivotal position with respect to the bands and spring means secured to the other end of the second band by the bolt means and urging the one end of the second band toward the one end of the first band.

9. Light support structure for a camp light or the like comprising a telescoping shaft including two tubular members, one of which is adapted to fit within the other, and means for securing the two tubular members in different relative axial positions with respect to each other, a bail, means for releasably securing the bail to one end of the telescoping shaft said means for releasably securing being secured to the bail and the one end of the telescoping shaft, means carried by the bail for supporting a camp light from the bail, a base for supporting the light support structure on the ground, and means for releasably securing the base to the other end of the shaft said last mentioned means being connected to the base and the other end of the shaft.

10. Structure as set forth in claim 9, and further including a reflector adjustably secured to the bail for reflecting light from a camp light supported by the bail.

11. Structure as set forth in claim 9 and further including means secured to the bail for securing a camp light supported by the bail from the means carried by the bail for supporting a camp light from movement relative to the bail due to wind or the like.

* * * * *